R. ROTHWELL AND W. H. CUTTRELL.
METHOD OF REMOVING FINS FROM RUBBER ARTICLES.
APPLICATION FILED DEC. 31, 1919.

1,339,789.  Patented May 11, 1920.

INVENTORS
Robert Rothwell
William H. Cuttrell
BY
ATTORNEYS

UNITED STATES PATENT OFFICE.

ROBERT ROTHWELL, OF KEYPORT, AND WILLIAM HUDSON CUTTRELL, OF MATAWAN, NEW JERSEY, ASSIGNORS TO WHITALL TATUM COMPANY, OF NEW YORK, N. Y., A CORPORATION OF NEW JERSEY.

METHOD OF REMOVING FINS FROM RUBBER ARTICLES.

1,339,789.      Specification of Letters Patent.      Patented May 11, 1920.

Application filed December 31, 1919. Serial No. 348,616.

*To all whom it may concern:*

Be it known that we, ROBERT ROTHWELL and WILLIAM HUDSON CUTTRELL, citizens of the United States, residing at, respectively, Keyport and Matawan, in the county of Monmouth, State of New Jersey, have invented new and useful Improvements in Methods of Removing Fins from Rubber Articles, of which the following is a specification.

This invention relates to the method of removing the thin fin of rubber produced on a high grade rubber molded article by the rubber flowing between the parting sections of the mold.

In forming rubber articles rubber or prepared caoutchouc is placed in a mold, shaped under pressure and vulcanized. When the mold is opened some of the compound extends around the article where it has been forced between the parts of the mold.

Heretofore, the surplus fin of rubber was removed by cutting with a knife or a pair of shears (on cheap rubber compound tumbling or buffing will answer) and unless the operator was very careful in gaging the cut the surface of the article would be marred and uneven.

It is the object of the present invention to remove the fin by heating the article after it has been removed from the mold so as to eliminate the surplus rubber without injuring the surrounding substance, and then plunging the article into cold water in order to stiffen the heat softened fin sufficiently to tumble off.

The invention resides more particularly in the novel combinations hereinafter described and claimed, reference being made to the accompanying drawing in which:

Figure 1:
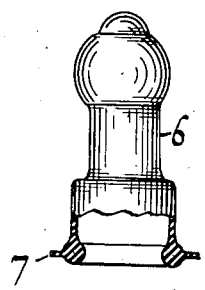
Figure 1 represents a side elevation partly in section showing the article after it is taken from the mold.
Figure 2:
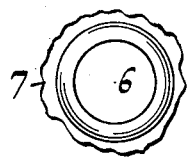
Fig. 2 is an inverted plan view of the same.

In Figs. 1 and 2 is shown a rubber nursing nipple 6 having a fin of rubber 7 slightly above the base. The illustration shows the nipple after it has been taken from a mold, and having been vulcanized to the proper degree. In molding this article, a fin of rubber is left on the beaded surface of the nipple caused by the compound flowing between the sections of the mold.

Figure 3:
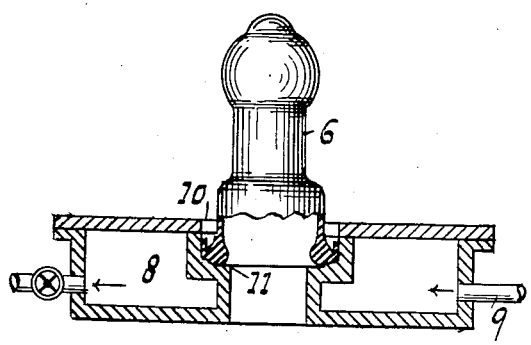
Fig. 3 is a vertical section of a heating apparatus.

In Fig. 3, is shown a convenient apparatus for eliminating the fin by heating a portion of the article. The apparatus includes a heating chamber 8, the heating being preferably generated by a connection 9 for admitting steam into the chamber. In the top of the chamber is disposed a recess or opening 10 practically cylindrical the lower portion of which forms a seat 11 for the base of the nipple to rest on. The lower portion of the nipple is inserted into the recess as indicated, and heated at the jointure of the fin with the bead to dissolve the thin membrane. It has been found that about 475 degrees Fahrenheit is sufficient to melt the portions of the fin extending from the circumference of the bead. There can be any number of recesses in the heater to simultaneously heat a number of nipples. The heat could be generated by a gas or oil jet or electrically heated plate without materially changing the apparatus.

Figure 4:
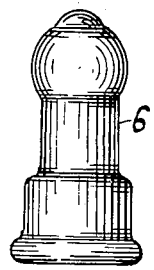
Fig. 4 is a side elevation of the finished article.

The nipple after it is heated is immersed in a tank containing water of normal temperature to give the softened fin a firm consistency. After the nipple has been removed from the tank it is placed into a large receptacle with a multitude of other nipples that have been so treated and the receptacle is rolled or tumbled. The constant friction of a mass of nipples rubbing against each other will smooth off the remains of the fin as indicated in Fig. 4.

It will be readily understood, that the method of removing the fins could be employed in numerous rubber articles such for example, as water bottles, bulbs and douche bags.

We claim:

1. The method of removing surplus rubber from rubber articles, which consists in subjecting a molded article to a degree of heat sufficient to eliminate the surplus rubber.

2. The method of removing surplus rubber from rubber articles which consists in subjecting a molded article to about 475 degrees of Fahrenheit to melt the surplus rubber.

3. The method of removing fins from soft rubber articles after molding, which consists in subjecting a portion of the article containing the fin to a sufficient degree of heat to eliminate the fin.

4. The method of removing fins from soft rubber articles after molding, which consists in subjecting a portion of the article containing the fin to a sufficient degree of heat to eliminate the fin, and immersing the article in water.

5. The method of removing fins from soft rubber articles after molding, which consists in subjecting a portion of the article containing the fin to a sufficient degree of heat to eliminate the fin, immersing the article in water, and smoothing the article by attrition.

6. The method of removing fins from soft rubber articles after molding, which consists in subjecting a portion of the article containing the fin to a sufficient degree of heat to eliminate the fin, immersing the article in water, and smoothing the article by tumbling a number together.

In testimony whereof we have hereunto set our hands in the presence of two subscribing witnesses.

ROBERT ROTHWELL.
WILLIAM HUDSON CUTTRELL.

Witnesses:
  CHARLES R. DAVISON,
  M. LESTER TERRY.